March 10, 1959 L. E. NICHOLSON 2,877,079
AUTOMATIC RESETTING TRANSIENT AUTOGRAPHIC RECORDERS
Filed Jan. 3, 1956 3 Sheets-Sheet 1

INVENTOR.
LAURENCE E. NICHOLSON
BY
Reynolds, Beach & Christensen
ATTORNEYS

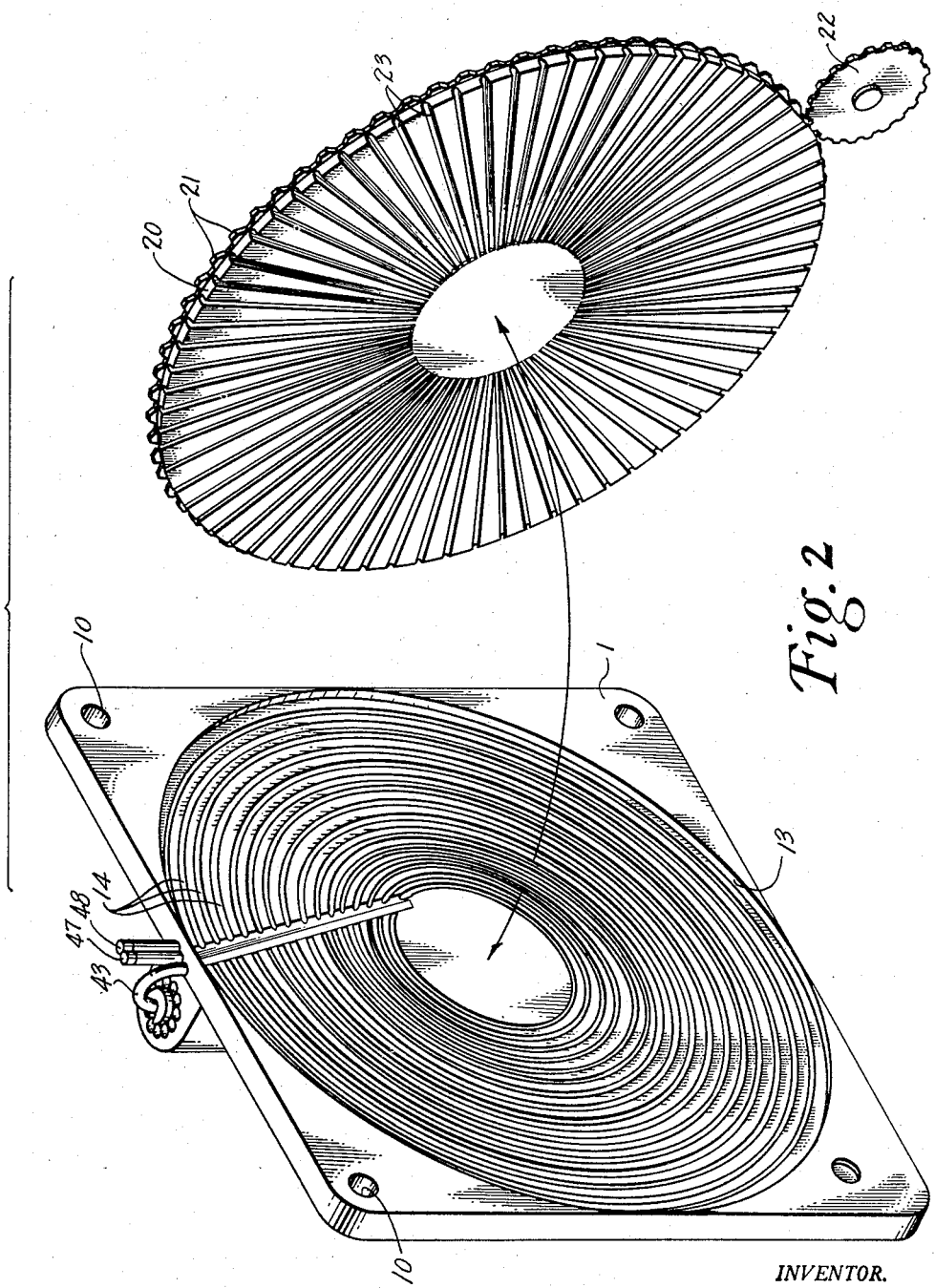

March 10, 1959  L. E. NICHOLSON  2,877,079
AUTOMATIC RESETTING TRANSIENT AUTOGRAPHIC RECORDERS
Filed Jan. 3, 1956  3 Sheets-Sheet 3

INVENTOR.
LAURENCE E. NICHOLSON
BY
ATTORNEYS

United States Patent Office 2,877,079
Patented Mar. 10, 1959

2,877,079

AUTOMATIC RESETTING TRANSIENT AUTOGRAPHIC RECORDERS

Laurence E. Nicholson, Anacortes, Wash.

Application January 3, 1956, Serial No. 557,047

10 Claims. (Cl. 346—21)

This invention pertains to an autographic recorder which is of the transient type so that the values of the function or phenomenon which it records will be altered periodically so that values will be recorded for only a predetermined time period.

A principal object of the invention is to provide an autographic recorder which can be observed at any time for the purpose of ascertaining the values of a function or phenomenon recorded which have occurred during a predetermined time period immediately past, such as twelve hours or twenty-four hours. Such as a recorder will be reset automatically and progressively without attention by an operator so that no recording elements such as paper disks or tapes need be replaced.

A further object is to employ resettable indicating elements which will preferably be relocated periodically as may be necessary to reflect changes in the value of the function or phenomenon being recorded.

Another object is to provide such mechanism which will be extremely reliable in operation and will require minimum maintenance.

It is also an object to provide such recording mechanism which will be comparatively inexpensive to manufacture and may be manufactured by mass production techniques.

In the drawings a representative form of device is illustrated as including two disks located with surfaces in face-to-face registry, which surfaces have cooperating families of grooves in them. In the face of one of such disks is a family of radial grooves corresponding respectively to time intervals, and in the other disk is a family of concentric annular grooves corresponding respectively to values of a function or phenomenon to be recorded. With these grooves cooperate indicating elements too large to be received fully in a single groove, but small enough to be received partially in a groove of one family and partially in a groove of the other family at a location where such grooves intersect. At one location of the concentric grooves a ramp is provided along which the indicating elements are swept from the grooves of the concentric family by grooves of the radial family to remove the balls from the grooves to a distributor. The position of the distributor is altered in response to changes in value of the function or phenomenon to be measured and is effective to deposit indicating elements successively in grooves of the concentric family corresponding to the values of the function or phenomenon to be recorded occurring at the respective times corresponding to the passage of the respective grooves of the radial groove family past the distributor.

Figure 2 is a view showing cooperating members separated and each in top perspective.

Figure 4 is an elevation view of a portion of the recorder as seen from the side opposite that from which Figure 3 is viewed, one of the members being shown in phantom.

Figure 1:
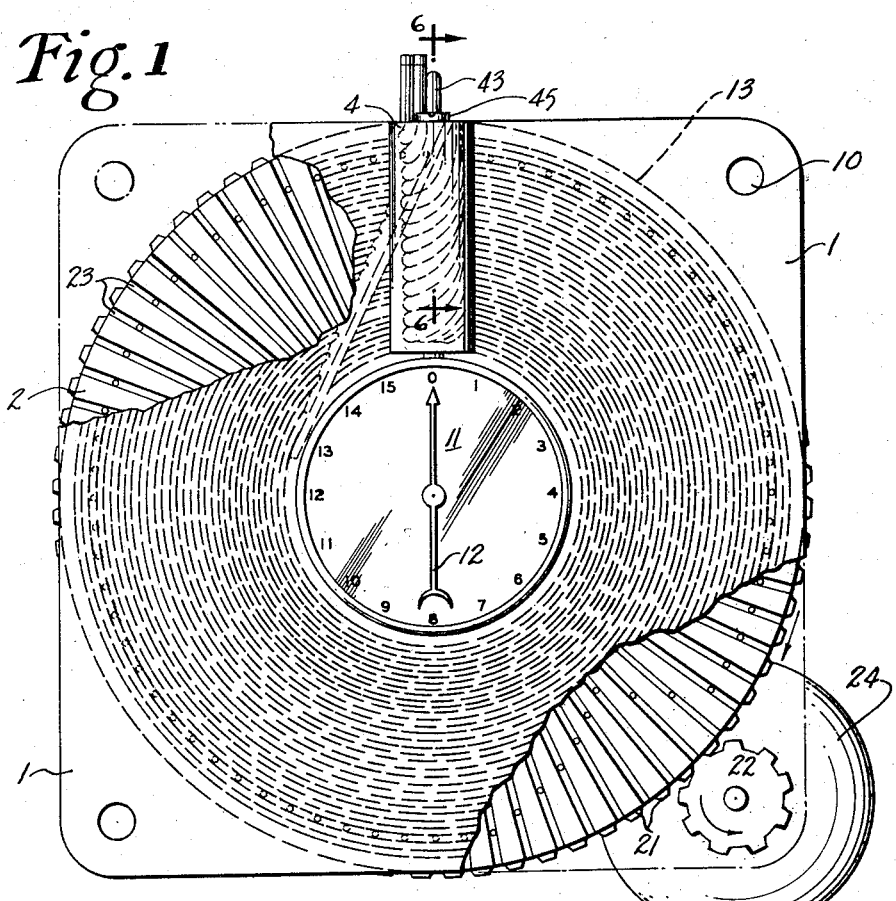
Figure 1 is a front elevation view of the recorder with parts broken away.
Figure 5:
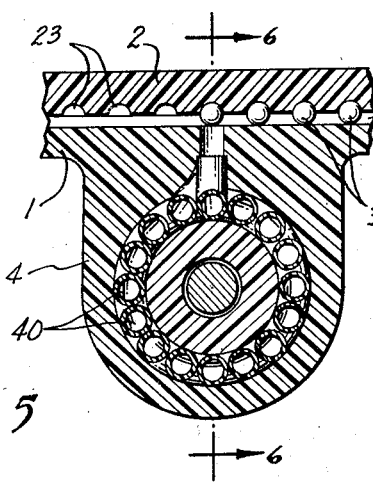
Figure 6:
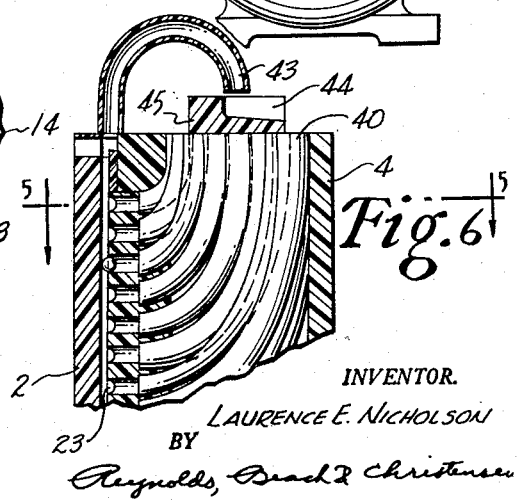

Figure 5 is a fragmentary detail view through the distributor and depositing mechanism, taken on line 5—5 of Figure 6, and Figure 6 is a detailed sectional view through the mechanism taken on line 6—6 of Figures 1 and 5.

The recorder of the present invention is not intended to provide a permanent record of periodic values of a variable function or phenomenon, but rather operates to provide a continually changing record of variable values over a predetermined period of time, preferably twelve hours or twenty-four hours in length, although the mechanism may be designed or adjusted to indicate values over a longer or a shorter period. Moreover, the mechanism will indicate throughout such period the value of the variable at predetermined short time intervals. Thus if the total time period is twelve hours, the interval between indications may be ten minutes, for example, whereas if the total time period is twenty-four hours, the interval may be twenty minutes, for example.

In either case, therefore, at any time the recorder would indicate approximately seventy-two values of the variable function distributed at regular intervals throughout the time period.

As each succeeding increment of time passes corresponding to an indicating time increment of the total period for which the values are indicated, a new value will be indicated and the first value of the new time period will be eliminated. In order to effect operation of this type it is preferred that the recorder utilize resettable indicating elements and that provision be made for resetting one element at the end of each time increment. It is convenient, therefore, to provide a locating element for an indicating element which corresponds to each time period increment.

While indications of the values for the variable function or phenomenon could be provided with any degree of accuracy desired, the mechanism can be considerably simplified if it is designed to indicate only approximately the actual value of the variable from time to time within the total possible range of variation. Thus sixteen possible values of the variable function might be indicated, and a choice of any one of such possible values can therefore be made for any time increment.

Mechanism capable of operating in accordance with these principles may incorporate five principal components or component types. The first component has elements corresponding to time increments and is driven by the second component which is timing mechanism capable of driving the time increment component so as to advance it through a distance corresponding to the spacing between adjacent time increment elements during each time increment. The third component is a member having elements corresponding respectively to various possible values of the variable function and which cooperate with the first component. The fourth component includes indicator elements located cooperatively by the time increment component and the indicated value component. The fifth component is distributor mechanism operable to locate an indicator element in registry with the proper selected indicated value element at times corresponding respectively to the various time increment elements for continuously resetting the values indicated by the recording mechanism.

In the form of mechanism illustrated in the drawings, the indicated value component is a stationary base or backing 1 preferably made of transparent plastic material of approximately square shape and having mounting apertures 10 in its corners for receiving suitable mounting screws or bolts. In the front central portion of the base may be located conveniently a momentary value indicator 11 having a circumferentially graduated face and a pointer 12 rotatable to designate a particular graduation.

The back of the base 1 has in it a substantially circular recess 13, and in this recess are provided indicated value elements preferably in the form of concentric circular grooves 14. The number of these grooves will be selected in accordance with the number of possible values of the variable function or phenomenon which it is desired to be able to indicate, and, as mentioned above, sixteen possible values may be utilized, in which event sixteen grooves 14 will be formed in the back surface of the base 1. It is preferred that the indicator elements be balls so that the grooves 14 conveniently may be of substantially semicircular cross section, although indicator elements of some other form could be used and the grooves 14 could be of a different appropriate shape.

With the backing plate or disk 1 a time increment component 2 cooperates. This component is formed by the disk 2 shown best in Figures 2 and 3, which is of a diameter to be received within the recess 13 of the plate 1, and of a thickness substantially greater than the depth of such recess. This disk has a shoulder 20 of a depth approximately equal to the depth of the recess 13 in plate 1 so that the disk 2 can be received to this extent in the plate 1. Around such shoulder are arranged gear teeth 21 meshing with the teeth of a small drive gear 22 operable to effect rotation of the disk 2.

The disk 2 is provided with time increment elements in the form of radial grooves 23 of a radial extent equal to the radial extent of the family of concentric value indicating circular grooves 14 in plate 1. The grooves 23 in the family of time increment grooves are spaced apart circumferentially equal distances corresponding to the respective time increments for which the register is to indicate selected values of the variable function or phenomenon being measured. Gear 22 will rotate the disk 2 at a speed such that the disk will move angularly through a distance equal to the circumferential spacing between adjacent radial grooves 23 in the desired increment of time. Such movement may be effected by mounting the gear 22 on a suitable gear head motor 24 shown in Figure 1, which preferably is of the synchronous type.

Preferably the cross-secticonal shape of the grooves 23 in the disk 2 corresponds to the cross-sectional shape of the grooves 14 in the plate 1, namely semi-circular, so that, when the disk 2 and the plate 1 are arranged with their grooved surfaces in face-to-face registry, the intersections of such grooves will provide pockets for reception of indicating elements in the form of balls 3. Distributor mechanism is then provided to place the indicator balls in appropriate intersections of the grooves. As each time increment corresponding to the respective grooves expires, a ball will be removed from the groove corresponding to the first time increment of a record period and a ball will be deposited in the last time groove of the record period.

As shown best in Figure 5, when the plate 1 and the disk 2 are in face-to-face registry, neither the radial groove 23 in the disk 2 nor the circular grooves 14 in the plate 1 are deep enough to accommodate the indicator balls 3 alone. On the contrary, when the balls are received in intersections of such grooves, approximately one-half of each ball is received in a radial groove 23 and the other half is received in a circular groove 14. The disk 2 is rotated approximately about the center of the circular grooves 14, and consequently the radial grooves 23 serve as abutments to sweep around a groove 14 a ball lodged in such circular groove and a radial groove.

While as far as reception of the indicator balls in intersections of grooves 14 and 23 and movement of such balls around the grooves 14 by the grooves 23 as the disk 2 rotates are concerned, it is immaterial what attitude the plate 1 and disk 2 may assume, it is preferable, to facilitate depositing the indicator balls in the appropriate groove intersections, for the plate and disk to be disposed in substantially vertical planes. Such disposition enables the force of gravity to be utilized in manipulating the balls for depositing them in the desired groove intersection corresponding to the appropriate value of the function or phenomenon at a particular instant.

Figure 3:
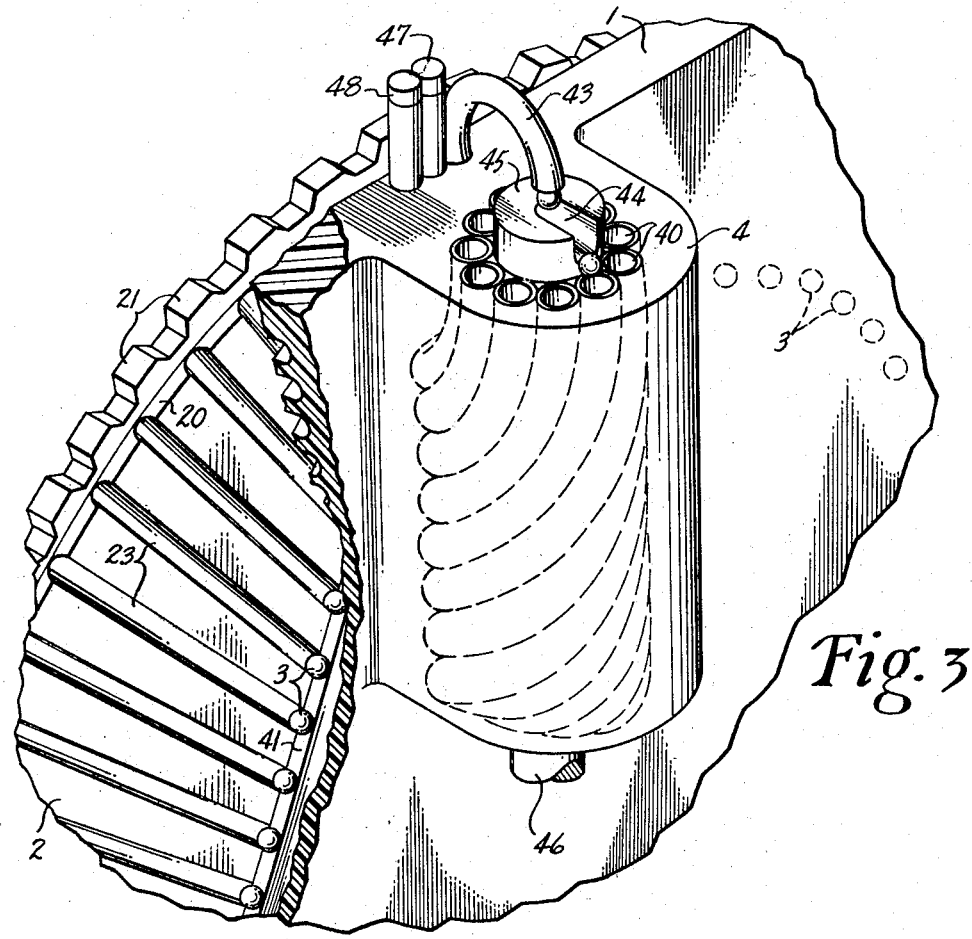
Figure 3 is an enlarged top perspective view of a portion of the recorder, parts having been broken away.

The distributor mechanism is shown best in Figures 3 to 6, inclusive, and includes the block 4 located at the upper edge of the plate 1. This block may be molded of plastic integrally with such plate, but in any event has a series of spiral passages or tubes 40 extending from its upper end downward which are of a size to enable indicator balls 3 to roll downward through them. These passages are grouped and spiral downward in substantially parallel relationship, being disposed so that, as shown in Figures 3 and 5, their upper ends are arranged in a circle in a horizontal plane, and their lower ends are arranged successively in a vertical line along a radius of the disk 2, as shown in Figure 6. The passage having its upper end nearest to the disk 2 has its lower end located highest in the series. The next passage counterclockwise in the circle of upper passage openings, seen in Figures 3 and 5, winds downward to a position just below the lower end of the highest passage and so on progressively until the lower end of the passage in a clockwise direction from the passage nearest to the disk 2 winds through a spiral of almost 360° to dispose its lower end the lowest in the series.

As will be seen in Figures 5 and 6, the tubes or passages 40 preferably are located as close together as possible. Their lower delivery ends are arranged to coincide respectively with grooves 23 in the plate 1. When a ball is dropped through one of these passages, therefore, it will be discharged into the corresponding circular groove 14. It cannot actually pass into such groove, however, unless a radial groove 23 is in registry with the lower end of the passages 40, as shown in Figures 5 and 6, because otherwise the groove 14 is not deep enough to accommodate the ball.

The location of the vertical row of passage 40 discharge ends will correspond to the end of a time period during which a record of values is to be made by the device described herein. At the end of such time period one of the radial grooves 23 of the disk 2 will be in registry with the row of passage delivery ends, as shown in Figures 5 and 6. A ball which has been dropped through any of the passages 40 will therefore move fully into the intersection of the corresponding circular groove 14 with the radial groove 23 in registry with such passage discharge ends. As the disk 2 is turned by gear 22 meshing with the gear teeth 21, therefore, such groove 23 will sweep the ball 3 lodged in it in a clockwise direction as seen in Figure 1 along the circular groove 14 in which it is lodged until near the end of the time period during which the recorder is capable of indicating values.

It will be evident that for any given time to which one of the radial grooves 23 corresponds there should be an indicating ball 3 in only one of the circular grooves 14, in order that only one value will be indicated for any given time. Consequently, before each groove 23 reaches a location in registry with the discharge openings of passages 40, they should be cleared of all balls in them. Such clearing action can be accomplished by provision of a ramp 41, shown best in Figures 3 and 4, which traverses the family of circular grooves 14.

The ramp bar 41 is carried by the plate 1 and is located in a wide groove 42 diagonally intercepting and interrupting all the grooves 14 of the circular groove family. As the radial grooves 23 sweep the successive balls 3 from the various grooves 14 in which they are lodged into the wide intercepting groove 42, each ball will drop through the radial groove 23 onto the ramp 41, because such ramp is located near the top of the disk 2 where the grooves 23 slope steeply downward.

As rotation of disk 2 continues, its radial grooves 23 will sweep the successive balls upward along the ramp bar 41.

The function of the distributor mechanism is to relocate the indicator balls 3 at the end of each time period so as to indicate the new value of the variable function or phenomenon at that particular time. In order to eliminate the necessity of an operator giving any attention to the recorder, the various balls are simply reset. It is necessary, therefore, for the balls 3 swept upward along the ramp strip 41 to be delivered to the distributor so that they may be repositioned in the grooves, as described above.

The distributor mechanism includes a curved tube 43 located at the upper end of the ramp strip 41, and which is of substantially U-shape. As the balls are pushed upward along the ramp in the manner indicated in Figure 4, they eventually will be pushed into the tube 43 and will form a column between its feed end and its highest point. As a sufficient number of balls is forced into the lower end of the tube, one ball after another will roll over the highest part of the tube 43 down into the radial groove 44 in a circular distributor block 45. This block is mounted concentrically with and within the circle formed by the upper ends of ball passages 40, as shown in Figure 3. The bottom of the groove 44 slopes somewhat so that a ball deposited in it from tube 43 will roll down the groove into the upper end of the passage 40 with which such groove is aligned.

The block 45 is mounted to turn about its axis by rotation of a spindle 46 projecting downward from it through distributor block 4, as shown in Figure 3. Both this spindle and the hand 12 of the indicator 11 are connected to mechanism, not shown, which moves in response to changes in value of the function or phenomenon to be recorded so that such distributor block 45 and hand 12 will be turned conjointly in response to movement of such mechanism. The drive mechanism for the distributor block can be controlled, such as by detents or the like, to move in step-by-step fashion so that the distributor block 45 will be turned from a position with groove 44 in alignment with one passage 40 to a position in which such groove is aligned with a different passage 40. A ball deposited in groove 44 will therefore always roll into a passage 40 instead of a location between such passages. Alternatively, or in addition, guard walls may extend upward from the upper end of each passage 40 at its outer side so that a ball discharged from groove 44 between two passages 40 will roll into one or the other of them depending on which is closer, instead of rolling between them and escaping from the distributor.

In operation the disk 2 will be rotated continuously by the motor 24 in proper timed relationship depending upon the total period over which the recorder is to indicate variable values. As this disk rotates it will clear the indicator balls 3 from the family of circular grooves 14 by sweeping them up the ramp 41 from the wide groove 42 intercepting the several grooves 14. These balls will be pushed successively into the feed tube 43 for the distributor mechanism, and they will drop one by one from such tube into the radial groove 44 of the distributor block 45. Depending upon the rotative position of this block, the balls will roll from such grooves into the appropriate spiral distribution passages 40, which correspond respectively to the several grooves 14. As each radial groove 23 passes the line of the discharge openings from passages 40, it will sweep a ball 3 along the circular groove in which it is lodged.

As the disk 2 continues to rotate in a clockwise direction, as seen in Figure 1, its radial grooves 23 will continue to sweep around the family of circular grooves 14 indicator balls 3 always spaced apart distances equal to the spacing of the radial grooves. Because plate 1 is transparent, an observer may then determine by the circuit of balls the amount and time of occurrence of the variations in value of the function or phenomenon recorded. The present instantaneous value will be indicated at any time by the pointer 12. The ball circuit will be reset automatically and progressively in the manner described so that the circuit will always indicate the conditions which have occurred during the predetermined time period immediately prior to the time the observation is made.

Occasionally because of a sudden change in value or for some other reason, two balls 3 may be deposited in two different passages 40 at the same time. To correct this condition on the next cycle provision should be made for storing one of such balls out of the circuit temporarily. Alternatively, for some reason the deposit of a ball at some particular time might not occur so that one of the radial grooves 23 will pass the groove loading station defined by the discharge ends of the passages 40 without any ball being received in it. In that case it will be desirable for a ball to be supplied to such radial groove during the next cycle. It is preferred, therefore, that a ball storage reservoir of small capacity be provided to which balls can be delivered if there are too many in the circuit and from which balls can be withdrawn if there are not enough in the circuit.

As has been discussed above, it is preferred that the recorder operate entirely automatically and this type of operation is also desirable in connection with the feature of supplying excess balls to and withdrawing them from a temporary storage reservoir. The reservoir may take the form of one or more tubes 47 and 48 having closed upper ends and located adjacent to the feed tube 43 of the distributor mechanism on the same side of such tube as the ramp. Such disposition of the storage tubes is shown best in Figures 3 and 4. If a particular radial groove 23 when it reaches the wide intercepting groove 42 has two balls in it instead of only one, the upper ball 3a, as shown in the figure, will be pushed upward into the storage tube 47, and only the lowermost ball 3 will be moved on into feed tube 43.

If there are balls in both storage tubes 47 and 48, they will all drop into each radial groove 23 as it moves past them. As such groove moves past storage reservoir 48, however, all but the lower two balls will be pushed back up into that tube. As this radial groove continues to rotate past reservoir tube 47, all but the lowermost ball will be pushed back up into this tube. The lowermost ball will then be pushed on into the tube 43. If a radial groove 23 should contain no ball immediately before it passes into registry with tube 48, all the balls in such tube will drop into that groove, but, as before, only two balls will be moved past tube 48 and only one ball will be moved past tube 47 into registry with tube 43. Nevertheless, by this procedure one of the balls stored in tube 48 will be delivered to feed tube 43, even though the groove 23 initially contained no ball.

Figure 4:
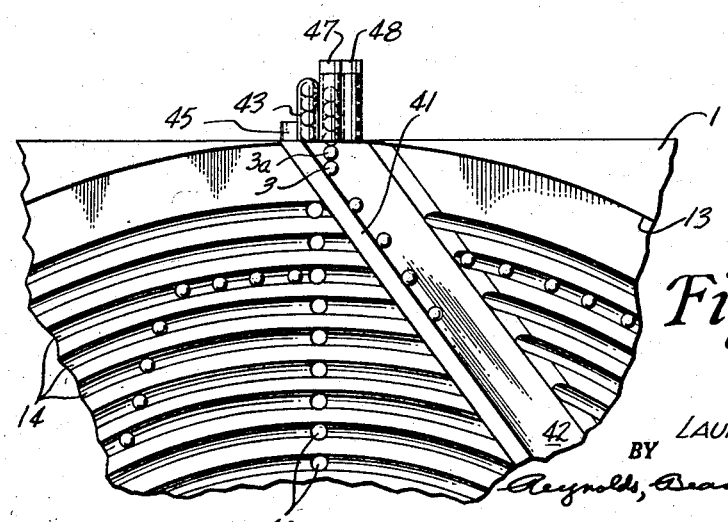

If, as shown in Figure 4, reservoir tube 48 is empty at the time an empty radial groove 23 moves into registry with it, the desired ball cannot, of course, be supplied by such reservoir tube. As that groove moves on into registry with tube 47, however, all the balls in that tube will drop into the groove. As the radial groove is rotated past tube 47, all the balls which drop from it, with the exception of one, will be moved back into such reservoir tube again, but this one will be swept on into the feed tube 43 to supply the deficiency in the ball circuit. Normally, however, the reservoirs 47 and 48 should not be required for satisfactory operation of the recorder.

I claim as my invention:

1. A device for designating desired values, comprising cooperating members having surfaces disposed in face-to-face registry, such surfaces of one of said members having therein a family of grooves, such surface of the other of said members having therein a family of complemental grooves extending transversely of and intersecting the grooves of said first family, designating elements too large to be received wholly in a single groove of one of said families, but small enough to be accommodated in co-operating grooves one from each of said families at an intersection thereof, depositing means cooperating with all the grooves of one family and operable to deposit a designating element in any selected one of such grooves, distributor means operable to distribute indicating elements to various selected ones of said depositing means, and means operable to effect relative movement of said members.

2. An automatically resetting transient autographic recorder comprising cooperating disks having surfaces disposed in face-to-face registry, said surfaces having cooperating families of grooves one family including concentric circular grooves and the other family including radial grooves, indicating elements too large to be received wholly in a single groove of one of such surfaces but small enough to be received in cooperating grooves at an intersection theerof, depositing means cooperating with all the grooves of one family and operable to deposit an indicating element in any selected one of such grooves, distributor means operable to distribute indicating elements to various selected ones of said depositing means, and means operable to effect relative rotation of said disks.

3. A device comprising cooperating members having surfaces disposed in face-to-face relationship, such surface of one of said members having therein a family of grooves, such surface of the other of said members having therein recesses registrable with the grooves of said family, designating elements too large to be received wholly in a single groove of said family but small enough to be received in cooperating grooves and recesses in registry, means operable to place designating elements in selected grooves of said family in registry with recesses, and means operable to effect relative movement of said members.

4. A device comprising a member having a surface with a family of grooves therein, elements engageable in the grooves of such family, a plurality of means cooperating respectively with the grooves of such family and operable to supply one of said elements to any selected one of such grooves, distributor means operable to distribute said elements to various selected ones of said first means to be supplied to their respective grooves, and means operable to move said elements along the grooves to which they are supplied.

5. A device comprising a member having a surface with a family of grooves therein disposed in generally parallel relationship and a groove inclined relative to and intersecting the grooves of said family, designating elements each too large to be received wholly in a groove of said family, and means engageable with portions of said designating elements projecting from the grooves of said family and movable relative to said member for shifting said designating elements along the grooves of said family to said inclined groove and thence along said inclined groove.

6. Delivery and storage mechanism comprising designating elements, a delivery tube of a size to receive designating elements therein, a passage inclined relative to said delivery tube, communicating therewith and of a size to receive designating elements therein, a storage compartment alongside said delivery tube for reception of designating elements therein, and means engageable with designating elements in said inclined passage and movable relative to said passage for shifting designating elements one by one into said delivery tube and designating elements in excess of one at any particular location into said storage compartment.

7. A device comprising a member having a plurality of grooves therein, designating elements engageable in said grooves, removing means engageable with designating elements in said grooves and movable relative thereto for extracting said designating elements from said grooves, delivery means communicating with said removing means and said grooves for receiving designating elements from said removing means and delivering them to said grooves, and storage means between and communicating with said removing means and said delivery means for receiving from said removing means designating elements in excess of those to be delivered by said delivery means.

8. A device comprising two cooperating members having respective surfaces disposed in registry, a family of elements on one of said surfaces, a family of elements on the other of said surfaces crossing the elements of said first family, a plurality of separate designators interengageable between cooperating elements of said families, means operable to effect relative movement of said members, and distributor means operable at a predetermined time to supply a separate one of said designators to the intersection of an element of said first family in registry with said distributor means and a selected element of said second family.

9. The device defined in claim 8, in which the distributor means includes a plurality of passages corresponding respectively to different selectable elements of the second family, and means movable to deposit designators in selected ones of such passages.

10. The device defined in claim 8, in which the distributor means includes a family of generally upright helical passages having their lower ends communicating respectively with different elements of such second family, and their upper ends arranged in a circle disposed substantially in a horizontal plane, a rotor rotatable about an axis concentric with the center of such circle of passage upper ends, having a passage registrable with various ones of said plurality of passages by rotation of said rotor about such axis, and means operable to turn said rotor to move its passage into registry with a selected one of said plurality of passages.

References Cited in the file of this patent

UNITED STATES PATENTS

| 813,933 | Abraham | Feb. 27, 1906 |
| 897,715 | Cowey | Sept. 1, 1908 |
| 2,537,628 | Hanson et al. | Jan. 9, 1951 |
| 2,555,567 | Bloxham | June 5, 1951 |
| 2,655,273 | Snow | Oct. 13, 1953 |